United States Patent
Ljungblad

(10) Patent No.: US 9,399,321 B2
(45) Date of Patent: Jul. 26, 2016

(54) METHOD AND APPARATUS FOR PRODUCING THREE-DIMENSIONAL OBJECTS

(75) Inventor: Ulric Ljungblad, Mölndal (SE)

(73) Assignee: Arcam AB, Moelndal (SE)

( * ) Notice: Subject to any disclaimer, the term of this patent is extended or adjusted under 35 U.S.C. 154(b) by 708 days.

(21) Appl. No.: 13/318,748

(22) PCT Filed: Jul. 15, 2009

(86) PCT No.: PCT/SE2009/050901
§ 371 (c)(1),
(2), (4) Date: Nov. 3, 2011

(87) PCT Pub. No.: WO2011/008143
PCT Pub. Date: Jan. 20, 2011

(65) Prior Publication Data
US 2012/0100031 A1    Apr. 26, 2012

(51) Int. Cl.
*B22F 3/105*  (2006.01)
*B29C 67/00*  (2006.01)
*B22F 3/00*   (2006.01)

(52) U.S. Cl.
CPC .............. *B29C 67/0077* (2013.01); *B22F 3/004* (2013.01); *B22F 3/1055* (2013.01); *B22F 2003/1056* (2013.01); *B22F 2998/00* (2013.01); *B22F 2999/00* (2013.01); *Y02P 10/295* (2015.11)

(58) Field of Classification Search
CPC ................... B22F 3/008; B22F 3/1055; B22F 2003/1056; B22F 2003/1057; B22F 2003/1058; B22F 2003/1059; B22F 2203/11; B22F 2207/15; B22F 2998/00; B22F 2998/10; B22F 2999/00; B22F 7/04; B22F 2007/042; B22F 2007/045; G01N 2223/633; G01N 2291/02854

See application file for complete search history.

(56) References Cited

U.S. PATENT DOCUMENTS 2,264,968 A * 12/1941 De Forest ............... G01B 7/00
136/200
2,323,715 A *  7/1943 Kuehni .................. G01N 25/18
374/44

(Continued)

FOREIGN PATENT DOCUMENTS

CN    101635210 A    1/2010
DE    19952998 A1    5/2001

(Continued)

OTHER PUBLICATIONS

United States Patent and Trademark Office, Notice of Allowance and Fee(s) Due for U.S. Appl. No. 13/144,451, mailed Sep. 25, 2012, 16 pages, USA.

(Continued)

*Primary Examiner* — Scott Kastler
*Assistant Examiner* — Vanessa Luk
(74) *Attorney, Agent, or Firm* — Alston & Bird LLP

(57) ABSTRACT

The invention concerns a method for producing three-dimensional objects (6) layer by layer using a powdery material (7) which can be solidified by irradiating it with a high-energy beam (4), said method comprising the steps of: applying a first layer of powdery material onto a working area (5); solidifying a part of said first layer by irradiating it with a high-energy beam; and applying a second layer (8) of powdery material onto the first, partly solidified layer. The invention is characterized in that the method comprises the step of: determining a rate at which the temperature of the second layer (8) increases after application onto the first layer. The invention also concerns an apparatus configured to operate according to the above method.

8 Claims, 2 Drawing Sheets

(56) References Cited

U.S. PATENT DOCUMENTS

| | | |
|---|---|---|
| 3,882,477 A | 5/1975 | Mueller |
| 4,348,576 A | 9/1982 | Anderl et al. |
| 4,401,719 A | 8/1983 | Kobayashi et al. |
| 4,818,562 A | 4/1989 | Arcella et al. |
| 4,863,538 A | 9/1989 | Deckard |
| 4,927,992 A | 5/1990 | Whitlow et al. |
| 5,182,170 A | 1/1993 | Marcus et al. |
| 5,483,036 A | 1/1996 | Giedt et al. |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A * | 4/2000 | Jeantette et al. ......... 219/121.63 |
| 6,162,378 A * | 12/2000 | Bedal et al. ................. 264/40.1 |
| 6,419,203 B1 | 7/2002 | Dang |
| 6,554,600 B1 | 4/2003 | Hofmann et al. |
| 6,583,379 B1 | 6/2003 | Meiners et al. |
| 6,751,516 B1 | 6/2004 | Richardson |
| 6,764,636 B1 | 7/2004 | Allanic et al. |
| 6,811,744 B2 * | 11/2004 | Keicher et al. ..................... 419/5 |
| 6,815,636 B2 * | 11/2004 | Chung et al. ............. 219/121.65 |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,540,738 B2 | 6/2009 | Larsson et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,310,188 B2 | 4/2016 | Snis |
| 2002/0104973 A1 | 8/2002 | Kerekes |
| 2003/0133822 A1 | 7/2003 | Harryson |
| 2004/0084814 A1 | 5/2004 | Boyd et al. |
| 2004/0104499 A1 | 6/2004 | Keller |
| 2004/0173496 A1 | 9/2004 | Srinivasan |
| 2004/0173946 A1 | 9/2004 | Pfeifer et al. |
| 2005/0186538 A1 | 8/2005 | Uckelmann |
| 2006/0108712 A1 | 5/2006 | Mattes |
| 2006/0147332 A1 | 7/2006 | Jones et al. |
| 2006/0157892 A1 | 7/2006 | Larsson |
| 2006/0180957 A1 * | 8/2006 | Hopkinson et al. ............ 264/405 |
| 2006/0284088 A1 | 12/2006 | Fukunaga et al. |
| 2007/0175875 A1 | 8/2007 | Uckelmann et al. |
| 2007/0182289 A1 | 8/2007 | Kigawa et al. |
| 2007/0298182 A1 | 12/2007 | Perret et al. |
| 2009/0017219 A1 | 1/2009 | Paasche et al. |
| 2009/0152771 A1 | 6/2009 | Philippi et al. |
| 2010/0310404 A1 | 12/2010 | Ackelid |
| 2011/0133367 A1 | 6/2011 | Weidinger et al. |
| 2011/0309554 A1 | 12/2011 | Liska et al. |
| 2011/0316178 A1 | 12/2011 | Uckelmann |
| 2012/0223059 A1 | 9/2012 | Ackelid |
| 2013/0300286 A1 | 11/2013 | Ljungblad et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0367367 A1 | 12/2014 | Wood et al. |
| 2015/0004045 A1 | 1/2015 | Ljungblad |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |

FOREIGN PATENT DOCUMENTS

| | | |
|---|---|---|
| DE | 20305843 U1 | 7/2003 |
| DE | 102005014483 A1 | 10/2006 |
| DE | 202008005417 U1 | 8/2008 |
| DE | 102007018601 A1 | 10/2008 |
| DE | 102008012064 A1 | 9/2009 |
| EP | 0 289 116 | 2/1988 |
| EP | 0289116 | 11/1988 |
| EP | 0322257 A2 | 6/1989 |
| EP | 0688262 A1 | 12/1995 |
| EP | 1418013 A1 | 5/2004 |
| EP | 1466718 A2 | 10/2004 |
| EP | 1683593 A2 | 7/2006 |
| EP | 1 721 725 | 11/2006 |
| EP | 1952932 A2 | 8/2008 |
| EP | 2011631 | 1/2009 |
| EP | 2119530 A1 | 11/2009 |
| EP | 2281677 A1 | 2/2011 |
| JP | 20033245981 | 9/2003 |
| SE | 524467 | 8/2004 |
| WO | WO 9308928 | 5/1993 |
| WO | WO 96/12607 A1 | 5/1996 |
| WO | WO 97/37523 A2 | 10/1997 |
| WO | WO 01/81031 A1 | 11/2001 |
| WO | WO 0185386 | 11/2001 |
| WO | WO 02/08653 A1 | 1/2002 |
| WO | WO 2004/043680 A2 | 5/2004 |
| WO | WO 2004/054743 | 7/2004 |
| WO | WO 2004/056511 | 7/2004 |
| WO | WO 2006/091097 A2 | 8/2006 |
| WO | WO 2006/121374 | 11/2006 |
| WO | WO 2007/112808 | 10/2007 |
| WO | WO 2007/147221 A1 | 12/2007 |
| WO | WO 2008/013483 A1 | 1/2008 |
| WO | WO 2008/057844 | 5/2008 |
| WO | WO 2008/125497 | 10/2008 |
| WO | WO 2008/147306 A1 | 12/2008 |
| WO | WO 2009/072935 A1 | 6/2009 |
| WO | WO 2009/084991 A1 | 7/2009 |
| WO | WO 2009/000360 A1 | 12/2009 |
| WO | WO 2010/095987 A1 | 8/2010 |
| WO | WO 2011/008143 A1 | 1/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2014/071968 A1 | 5/2014 |
| WO | WO 2014/095200 A1 | 6/2014 |
| WO | WO 2014/095208 A1 | 6/2014 |

OTHER PUBLICATIONS

United States Patent and Trademark Office, Office Action for U.S. Appl. No. 12/810,602, mailed Sep. 10, 2012, 13 pages, USA.
European Search Report dated Feb. 16, 2012, for corresponding Application No. EP07 852 089.7.

(56) References Cited

OTHER PUBLICATIONS

Office Action dated Feb. 14, 2012 for U.S. Appl. No. 12/745,081.
United States Patent and Trademark Office, Office Action for U.S. Appl. No. 12,810,602, Dec. 20, 2012, 8 pages, USA.
International Search Report dated Sep. 4, 2010 for application No. PCT/SE2009/050901.
Office Action dated Nov. 8, 2011, U.S. Appl No. 12/745,081.
International Search Report dated Sep. 17, 2008 for Application No. PCT/SE2008/000007.
International Search Report dated Sep. 2, 2008 for Application No. PCT/SE2007/001084.
International Preliminary Report on Patentability dated Nov. 27, 2009 for Application PCT/SE2007/001084.
United States Patent and Trademark Office, Final Office Action for U.S. Appl. No. 12/745,081, dated Jun. 21, 2012, 6 pages, USA.
Cheah, Chi-Mun, et al., "Automatic Algorithm for Generating Complex Polygedral Scaffold Structure for Tissue Engineering", Tissue Engineering, 2004, pp. 595-610, vol. 10, No. 3/4. XP002691483.
Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.
International Preliminary Examining Authority (IPEA), Second Written Opinion for International Application No. PCT/EP2012/076025, mailed Dec. 4, 2013, 4 pages European Patent Office, Germany.
International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, mailed Apr. 4, 2014, 15 pp., European Patent Office, Germany.
International Preliminary Examining Authority, International Preliminary Report on Patentability for International Application No. PCT/EP2012/074383, including Applicant's Sep. 6, 2013 Reply to ISA's Feb. 27, 2013 Written Opinion, mailed Jan. 20, 2014, 16 pages, European Patent Office, The Netherlands.
International Searching Authority (ISA), International Search Report and Written Opinion for International Application No. PCT/EP2012/076025, mailed May 17, 2013, 11 pages, European Patent Office, The Netherlands.
International Searching Authority, International Search Report and Written Opinion for International Application No. PCT/EP2012/074383, mailed Feb. 27, 2013, 10 pages, European Patent Office, The Netherlands.
Weigel, TH., et al., "Design and Preparation of Polymeric Scaffolds for Tissue Engineering," Expert Rev. Med. Devices, 2006, pp. 835-851, vol. 3, No. 6, XP002691485.
Yang, et al., "The Design of Scaffold for Use in Tissue Engineering, Part II, Rapid Prototyping Techniques", Tissue Engineering, 2002, pp. 1-11, vol. 8, No. 1, XP002691484.
International Searching Authority, International Search Report for International Application No. PCT/SE2011/050093, mailed Oct. 20, 2011, 5 pages, The Swedish Patent and Registration Office, Sweden.
United States Patent and Trademark Office, Office Action for U.S. Appl. No. 12/810,602, Sep. 11, 2014, 7 pages, USA.
United States Patent and Trademark Office, Office Action for U.S. Appl. No. 14/350,767, Nov. 24, 2014, 16 pages, USA.
International Searching Authority, International Search Report for International Application No. PCT/EP2012/058733, Mar. 5, 2013, 4 pages, European Patent Office, The Netherlands.

* cited by examiner

METHOD AND APPARATUS FOR PRODUCING THREE-DIMENSIONAL OBJECTS

CROSS REFERENCE TO RELATED APPLICATIONS

This application is a national stage application, filed under 35 U.S.C. §371, of International Application No. PCT/SE2009/050901, filed Jul. 15, 2009, which is hereby incorporated by reference in its entirety.

BACKGROUND OF THE INVENTION

1. Field of Invention

This invention relates to a method and apparatus for producing three-dimensional objects layer by layer using a powdery material which can be solidified by irradiating it with a high-energy beam.

2. Description of Related Art

Equipment for producing a three-dimensional object layer by layer using a powdery material which can be solidified by irradiating it with electromagnetic radiation or an electron beam are known from e.g. U.S. Pat. Nos. 4,863,538, 5,647,931 and WO 2004/056511. Such equipment include for instance a supply of powder, means for applying a layer of powder onto a working area of a work table, and means for directing the beam over the working area. The powder sinters or melts and solidifies as the beam moves or sweeps over a working area.

For product quality reasons it is important that the applied layer of powder is evenly distributed over the working area and that the layer thickness is well-defined and corresponds to a predetermined value. Further, it is advantageous that the layer is quickly applied in order to keep the production rate as high as possible.

Traditionally, powder application means includes a feeding member and a distribution member where the former transfers a certain quantity of powder from the supply of powder to the distribution member, which in turn distributes the powder over the working area. WO 2006/121374 discloses another variant wherein a distribution rake is arranged to be moveable towards and a certain distance into the powder supply such as to work both as feeding member and distribution member.

For quality assurance reasons, and for making it possible to e.g. re-apply a layer of powder if the powder distribution is not correct, it would be desirable to determine the thickness and homogeneity of a layer of powder that has been applied onto the working area. However, how to do this in an easy and efficient way is not evident, irrespective of what type of powder application means that are used. Therefore, focus has generally been set on improving the reliability of the powder application systems.

An example of a system for monitoring the surface height/thickness of a layer in a selective deposition modelling (SDM) apparatus is disclosed in U.S. 2002/0104973. The system makes use of a light source, such as a laser, that directs a beam of light downwards towards the layer of non-solidified build material. A light detector, arranged at an angle in relation to the light source, detects scattered light from the surfaces of the non-solidified layer and the solidified layer below. The thickness of the non-solidified layer is then calculated by means of triangulation. The application described makes use of a liquid build material. Although the system disclosed may work well in certain situations it will not work properly when non-transparent build materials are used, such as metal powder. Further, the system requires additional equipment that is difficult and expensive to install in some types of apparatuses.

Thus, there is still a need for a system/method for checking the thickness and distribution of a layer of powder that has been applied onto the working area, in particular in cases where metal powder is used.

BRIEF SUMMARY

An object of this invention is to provide a method that exhibit improved properties with regard to layer thickness determination compared to conventional methods. This object is achieved by the method and corresponding apparatus defined by the technical features contained in independent claims 1 and 9. The dependent claims contain advantageous embodiments, further developments and variants of the invention.

The invention concerns a method for producing three-dimensional objects layer by layer using a powdery material which can be solidified by irradiating it with a high-energy beam, said method comprising the steps of: applying a first layer of powdery material onto a working area; solidifying a part of said first layer by irradiating it with a high-energy beam; and applying a second layer of powdery material onto the first, partly solidified layer.

The inventive method is characterized in that it comprises the step of: determining a rate at which the temperature of the second layer increases after application onto the first layer.

Because a thicker layer placed on a hot surface heats up at a slower rate than a thinner layer, at least with regard to the layer surface temperature, it is possible to relate the temperature increase rate to layer thickness. Thus, the inventive method makes it possible to determine the layer thickness by determining the rate of the temperature change.

A powder layer applied onto the working area normally heats up relatively quickly due to a relatively quick heat transfer from the hot, partly solidified layer(s) positioned below. It is well known to use temperature sensing devices, such as thermographic (IR) cameras or pyrometers, for measuring the temperature of a surface of an applied powder layer. However, these measurements are normally carried out for the purpose of checking the temperature before solidification and relate to the point of time when the temperature curve has levelled off, i.e. when the temperature of the applied powder layer has reached and passed a maximum temperature. In contrast to such conventional measurements, the inventive method concerns the rate at which the temperature of the layer of powdery material increases before the temperature curve has levelled off.

The temperature increase rate can be expressed in several ways. Generally, the temperature in a certain position at the surface of the applied powder layer depends on the time lapsed since application of powder at that position. Further, the temperature increase rate, or derivative $dT/dt$, in a certain position will generally be decreasing with time and asymptotically approach zero (because the driving force, i.e. the temperature difference, decreases with time). One example of expressing the determined temperature increase rate is to say that it corresponds to the length of the time period from application of powder (in a certain position) to the point of time when the maximum temperature is reached (in the same position). Another example is to determine the actual temperature increase rate at a certain point of time. Still another example is to fit a mathematical function to measured data of the time dependency of the temperature and from this function fitting generate a parameter corresponding to the temperature increase rate. Irrespective of how the determined temperature increase rate is expressed, it can be related to layer thickness.

In an embodiment of the invention, the method comprises the step of: measuring a temperature in at least one position of said second layer using a temperature sensing device. This is a suitable way of obtaining data for carrying out the inventive method. Moreover, a temperature sensing device, such as a thermographic camera or a pyrometer, forms in many cases already part of the apparatus used for the type of production of three-dimensional objects discussed here.

Preferably, the step of measuring the temperature comprises the step of: performing a plurality of sequential temperature measurements in the same at least one position of said second layer, wherein said plurality of measurements are carried out before the second layer has reached a maximum temperature. This means that a data series is obtained of the temperature as a function of time over a time period during which the temperature of the second layer increases. Such a data series is very useful for determining the temperature increase rate.

In a further embodiment of the invention, the method comprises the step of: measuring a temperature in a plurality of positions of said second layer, wherein said plurality of positions are distributed over the second layer. Thereby, it becomes possible to determine the temperature increase rate over a larger part of the second layer, preferably the entire layer, which in turn makes it possible to determine whether the layer is evenly distributed.

In a further embodiment of the invention the temperature sensing device is a thermographic camera that, preferably, is directed towards an upper surface of the second layer.

In a further embodiment of the invention, the method comprises the step of: comparing the determined temperature increase rate with one or several reference values. Such a comparison can be used to determine whether the temperature increase rate, and thus the thickness of the powder layer, is within a certain acceptable interval. It can also be used to determine the actual layer thickness.

In a further embodiment of the invention, the method comprises the step of: fitting a mathematical function to data obtained from said plurality of sequential temperature measurements. This is an efficient way of handling the measured data and, further, the fitted function, i.e. the fitted parameters, are useful for determining the temperature increase rate. Preferably, the function used for fitting is the correct theoretical function for temperature equilibrium involving heat conduction from the underlying layer(s) and heat radiation from the second, upper layer.

The invention also concerns an apparatus for producing three-dimensional objects layer by layer using a powdery material which can be solidified by irradiating it with a high-energy beam, which apparatus is configured to operate according to the above method.

BRIEF DESCRIPTION OF THE FIGURES

In the description of the invention given below reference is made to the following figure, in which.

DETAILED DESCRIPTION OF VARIOUS EMBODIMENTS

Figure 1:
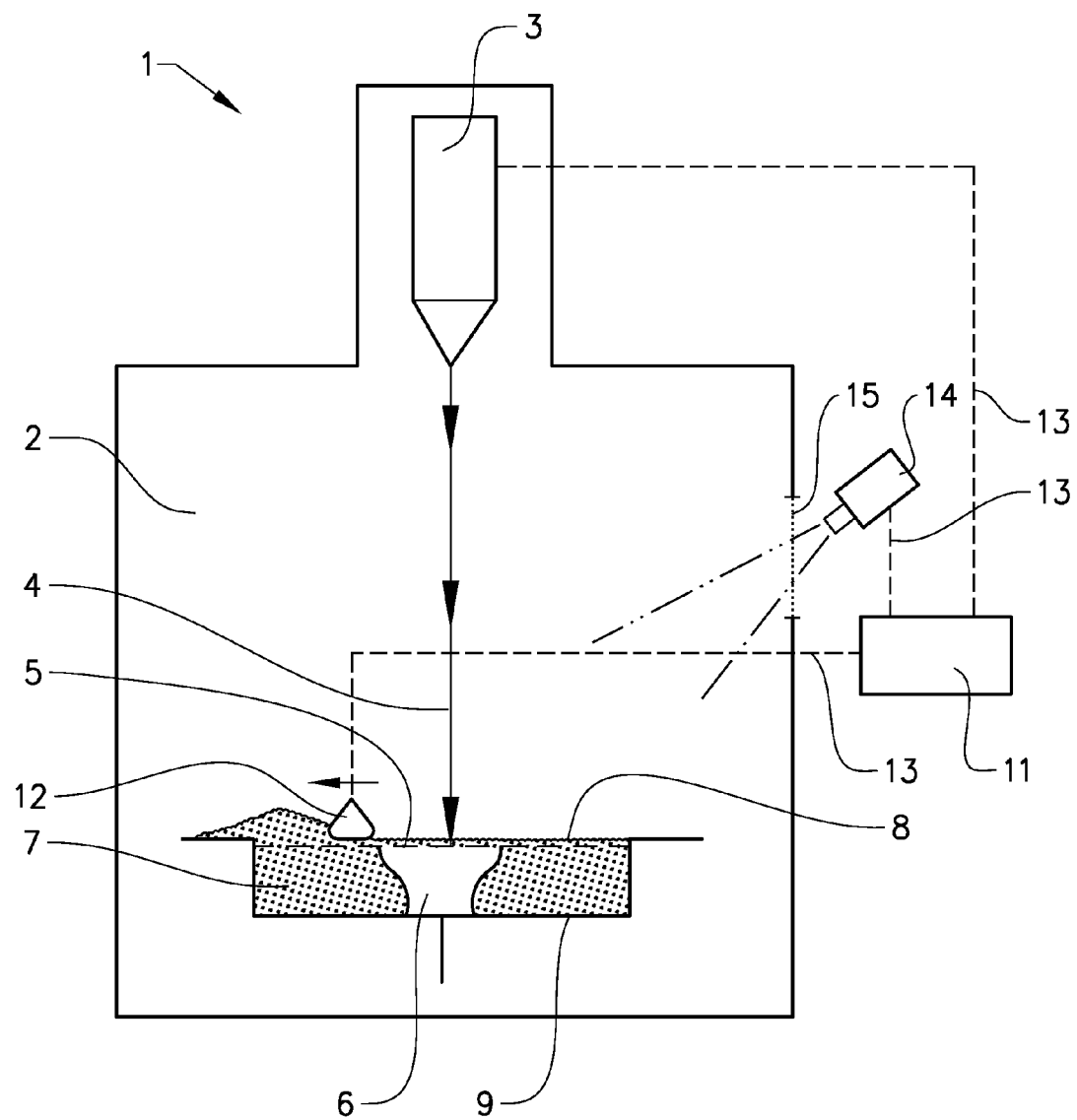
FIG. 1 shows, in a schematic view, an embodiment of an apparatus suitable for carrying out the inventive method.

FIG. 1 shows, in a schematic view, a preferred embodiment of an inventive apparatus 1 for producing a three-dimensional object 6 layer by layer using a powdery material which can be solidified by irradiating it with an energy beam. The described apparatus 1 is suitable for applying the inventive method. The apparatus 1 comprises an electron gun 3 capable of generating an electron beam 4 in an evacuated chamber 2. A powder bed 7, i.e. a plurality of partly solidified layers placed on top of each other, is positioned onto a height adjustable work table 9. Powder, which in this example is made of a metallic material, is taken from a powder supply (not shown) and applied, using a powder distributing member 12, layer by layer onto the working table 9. An upper part of the powder bed 7 forms a working area 5 over which the electron beam 4 sweeps during irradiation. After irradiation and fusing together of selected parts of a first, upper powder layer applied onto the working area 5, a second, new layer of powder 8 is distributed over the working area 5 on top of the powder bed 7. These parts, as well as how to control the electron gun 3, how to establish vacuum in the chamber 2 etc., are well known to the skilled man in the art.

The inventive apparatus 1 further comprises a temperature sensing device in the form of a digital thermographic camera 14 (sometimes also referred to as e.g. "IR camera") positioned outside of the chamber 2 at a level above and at a side of the working area 5 and directed at an angle downwards towards the working area 5, i.e. towards an upper surface of an uppermost powder layer. A window 15 that is transparent to the relevant radiation wavelengths is positioned in a wall of the chamber 2 to allow the camera 14 to sense the temperature of the working area 5. The camera 14 is electronically connected to a control unit 11 that in turn is electronically connected for controlling purposes to e.g. the electron gun 3 and the equipment driving the powder distributing member 12. The electronic connections are indicated with dashed lines 13. To reduce the angle between the camera 14 and the working area 5, the camera 14 and the window 15 can instead be arranged on the upper side of the chamber 2, some distance at the side of the electron gun 3.

The signals from the thermographic camera 14 are processed and analyzed by the control unit 11. Thermographic cameras and processing/analysis of the signals generated by such cameras are well known and not described in detail here. It may be mentioned that signal processing may be carried out in the camera 14 itself or in auxiliary units connected to the camera 14 and/or to the control unit 11. It may also be mentioned that at least some of the prior art apparatuses of the type described here are equipped with a temperature sensing device, for instance a thermographic camera. However, the temperature sensing devices of prior art apparatuses has been used for another purpose.

When a new, second powder layer 8 has been applied onto a first and partly solidified powder layer that previously has been applied onto the working area 5, the thermographic camera 14 is in the inventive method used to determine a rate at which the temperature of the second layer 8 increases after application onto the first layer. This is used for checking the thickness and homogeneity of the second layer.

A preferred embodiment of the inventive method comprises the following steps:
A) Performing a plurality of sequential temperature measurements in a plurality of positions of the second layer 8, wherein said plurality of measurements are carried out before the second layer 8 has reached a maximum temperature $T_1$ (see below) and wherein said plurality of positions are distributed over the second layer 8.

B) Fitting mathematical functions to data obtained from step A, wherein one function is fitted to each of said positions of the second layer 8.

C) Determining a temperature increase rate for each of said positions using results from step B.

D) Storing the determined temperature increase rates.

E) Comparing each of the determined temperature increase rates with one or several reference values.

F) In case any of the determined temperature rates is lower than or higher than a set value, reapplying a layer of powdery material onto the working area 5.

The measurements in step A are carried out by the thermographic camera 14 which is controlled by the control unit 11. The camera 14 is directed towards the upper surface of the second layer 8 which means that it in principle can register a surface temperature of the second layer 8 (even if heat radiated from material positioned slightly below the surface also may reach the camera 14). The position and direction of the camera 14 implies also that the "positions" referred to in step A above in principle are two-dimensional area units in the lateral plane, i.e. a portion of the upper surface of the second layer 8. The size of each "position" can be varied and depends e.g. on the resolution (the number of pixels) of the camera 14, the distance between the camera 14 and the second layer 8, and the number of pixels used for each "position".

The camera 14 is controlled such as to, for all positions, carry out a sequence of temperature measurements that are distributed over a time period during which the second layer 8 heats up as a result of heat conduction from the layer(s) below. After some time the (surface of the) second layer 8 reaches a maximum temperature $T_1$ (see FIGS. 2 and 3). Roughly, at this point in time the rate at which heat is conducted from the layer(s) below equals the rate at which heat is radiated away from the upper surface of the second layer 8. After that point the temperature of the second layer 8 decreases (at a moderate rate).

The sequential temperature measurements should be initiated as soon as possible after application of powder because the temperature increase rate decreases with time and because the time to reach the maximum temperature is rather short, typically around 1 sec for the apparatus described above. Since the powder distributing member 12 moves from one side to the other over the working area 5 the point of time at which the powder layer 8 is applied onto the working area 5 varies depending on the position of the layer 8. Therefore, the sequential temperature measurements in a particular position of the second layer 8 should start as soon as possible after application of powder in that particular position. Preferably, a number of temperature measurements are carried out also at and after the second layer 8 has reached its maximum temperature.

The camera 14 registers data also when the powder distributing member 12 moves. This means that pixels "viewing" at positions just at the rear of the member 12 can be used to get measurement data shortly (within around 0.1 s) after powder application.

The plurality of sequential temperature measurements carried out in each position before the second layer 8 has reached the maximum temperature $T_1$ includes at least two temperature measurements. From these two data points it can be possible to estimate the temperature increase rate, in particular if at least one further data point at and/or after the second layer 8 has reached its maximum temperature also is obtained. However, since the temperature increase rate is not linear it is recommended to perform at least three temperature measurements before the second layer 8 has reached the maximum temperature $T_1$. In principle, the higher the number of data points (i.e. temperature measurements), the better the function fit. A measurement frequency of around 10 Hz, i.e. one measurement each 0.1 s, has shown to work well.

Fitting of mathematical functions to data points is well known to the person skilled in the art. Although a standard parameter fit ($y=a_0+a_1x+a_2x^2+\ldots+a_nx^n$) probably could be used in the present case, the fit is preferably made by using an adequate theoretical function for temperature equilibrium involving heat conduction from the underlying layer(s) and heat radiation from the second, upper layer. Such a theoretical function can for instance comprise the following parameters: layer thickness, material properties of the powdery material and powder particle size distribution. An advantage of using an adequate theoretical function is that the resulting layer thickness is derived from relevant physical relationships.

The expression "fitting of a (mathematical) function" is considered to cover also the situation where only two data points are available (in which case a line or curve is "fitted" to two points).

An analysis of the measurement data obtained in step A is made for all positions distributed over the second layer 8. With a proper distribution of the positions, this provides information on the temperature increase rate over the entire layer 8.

In the step following the fitting of functions it is determined a temperature increase rate for each of said positions. This step may be regarded as a part of the fitting-step. Typically, a parameter is determined in the fitting-step, which parameter represents the temperature increase rate. This rate is in turn directly related to the thickness of the second powder layer 8.

Storing of the determined temperature increase rates, e.g. in a memory connected to the control unit 11, is useful not only for making the data available for calculations and comparisons but also for quality assurance reasons. For instance, if an object produced by the inventive method breaks in a certain way during use it may be helpful to go back to production data and find out whether the thickness and/or homogeneity of the powder layers have been correct. It may also be possible to scrap such produced objects after manufacturing where the layer thickness measurements do not fulfil predetermined quality values.

In the following step each of the determined temperature increase rates is compared with one or several reference values. In case any of the determined rates (or another parameter related in a known way to a corresponding rate) is lower than or higher than a set value, this step is followed by the step of reapplying a layer of powdery material onto the working area 5. This means that if the second layer for instance is not sufficiently homogenously distributed over the working area 5, the powder distribution member 12 will complement it with another layer of powdery material.

Figure 2:
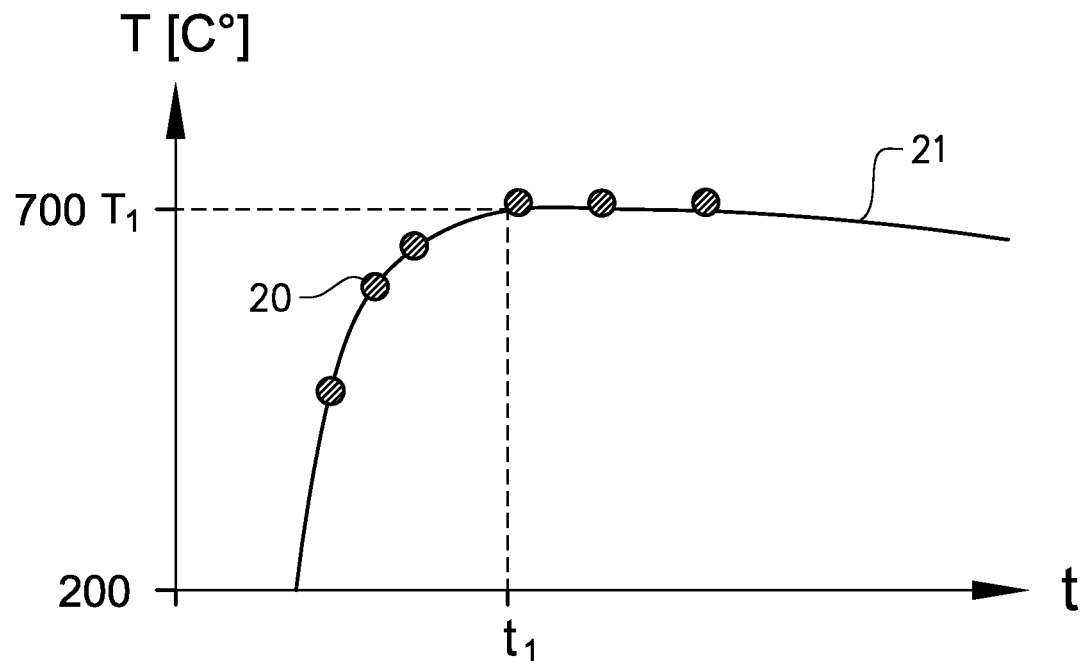
FIG. 2 shows a schematic example of measured and fitted temperature data of a "thin" powder layer.
Figure 3:
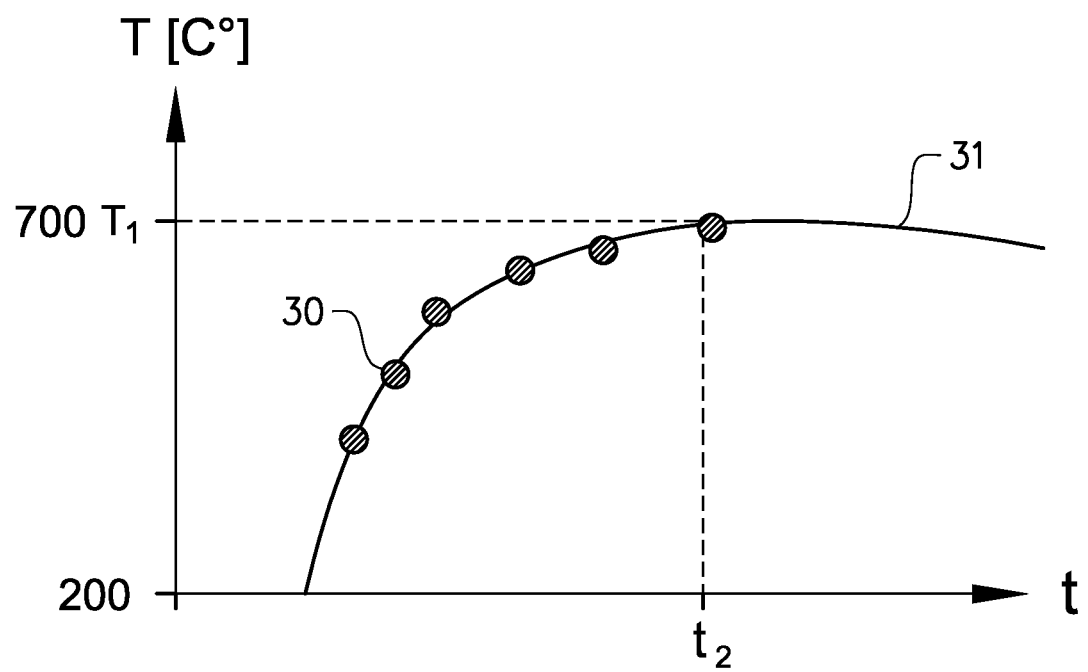
FIG. 3 shows a schematic example of measured and fitted temperature data of a "thick" powder layer.

FIG. 2 shows a schematic example of measured and fitted temperature data of a "thin" second powder layer 8 (or a position of the second layer in which the layer is "thin"). As a comparison, FIG. 3 shows a schematic example of measured and fitted temperature data of a "thick" second powder layer 8 (or a position of the second layer in which the layer is "thick"). Thus, the data in FIG. 3 refer to a thicker powder layer than the data in FIG. 2.

Data points 20 in FIG. 2 represent the sequential temperature measurements, whereas a curve 21 represents the function fitted to the data points 20, i.e. the curve 21 represents the temperature at the surface of the powder layer. It can be seen that the temperature increases very fast in the beginning (shortly after application of powder) which means that the temperature increase rate, i.e. the derivative of the curve 21, is very large in the beginning. The rate decreases successively and becomes zero at $t=t_1$ at which point of time the temperature has reached its maximum temperature $T_1$. After this, the temperature decreases slowly.

In the schematic example shown in FIG. 2, the number of data points 20 representing the sequential temperature measurements is six; three before the temperature has reached its maximum temperature $T_1$, and three at or after the point of time $t_1$ when the maximum temperature $T_1$ has been reached.

In similarity with FIG. 2, data points 30 in FIG. 3 represent the sequential temperature measurements, whereas a curve 31 represents the function fitted to the data points 30, i.e. the curve 31 represents the temperature at the surface of the "thick" powder layer. Also in this case the number of data points 30 is six, but in this case five of them refer to the time period before the temperature has reached its maximum temperature $T_1$, The point of time in which the maximum temperature $T_1$ is reached is denoted $t_2$ in FIG. 3.

By comparing FIGS. 2 and 3 the principal difference between layers of different thickness can be seen in that the temperature increases more slowly in the "thick" layer of FIG. 3 which means that the temperature increase rate is lower in the "thick" layer. In both cases the rate decreases successively and becomes zero when the temperature has reached its maximum temperature $T_1$, which maximum temperature $T_1$ has about the same value in both cases. However, the time lapsed until the maximum temperature $T_1$ is reached differs; t2>t1.

Each individual temperature measurement 20, 30, i.e. each "sampling" of the temperature, is preferably carried out during such a short period of time that the temperature variation during this period of time is negligible.

The temperature sensing devices of prior art apparatuses has generally been used for checking the temperature before solidification and relate to the point of time when the temperature curve has levelled off, i.e. when the temperature of the applied powder layer has reached and passed a maximum temperature. Such a prior art temperature measurement corresponds to one point at the far right of the temperature curves shown in FIGS. 2 and 3.

A thermographic camera, sometimes called infrared (IR) camera or thermal camera, is commonly regarded as a device that can form an image using infrared radiation, similar to a common camera that forms an image using visible light. A digital thermographic camera can be regarded as a temperature sensing device wherein each pixel forms an individual temperature sensing unit. The temperature measurements, i.e. the data points 20, 30 in FIGS. 2 and 3, can be based on the signal from an individual pixel or from several pixels.

The invention is not limited by the embodiments described above but can be modified in various ways within the scope of the claims. For instance, a pyrometer can be used instead of, or as a complement to, the thermographic camera 14. However, a camera of the described type is advantageous in that it allows determination of the temperature increase rate in several positions of the layer which in turn makes it possible to determine the homogeneity of the layer (i.e. the vertical uniformity of the powder layer).

Moreover, the high energy beam can be a laser beam generated by a laser source instead of the exemplified electron beam. Further, the powdery material does not necessarily have to be made of metal but can be of e.g. plastics or a composite material.

If the point of time is known at which powder is applied in a certain position onto the working area 5, it can be sufficient to carry out only one temperature measurement at that position (before the maximum temperature is reached) to determine, or at least estimate, the temperature increase rate. This point of time of powder application may be possible to obtain from information via the control unit 11 on the position of the powder distribution member 12 or from optical information. However, determining the exact point of time for powder application may be complicated and, further, using only one single temperature measurement for determining the temperature increase rate introduces a significant uncertainty in the result obtained. By performing a plurality of sequential temperature measurements that "follows" the temperature curve it is not necessary to establish the point of time for powder application; if desired this can be calculated using the fitted function.

The invention claimed is:

1. Method for producing three-dimensional objects (6) layer by layer using a powdery material (7) which can be solidified by irradiating it with a high-energy beam (4), said method comprising the steps of;
   applying a first layer of powdery material onto a working area (5);
   solidifying a part of said first layer by irradiating it with a high-energy beam;
   applying a second layer (8) of powdery material onto the first, partly solidified layer;
   determining a rate at which the temperature of the second layer (8) increases after application onto the first layer; and
   determining a layer thickness of the second layer based upon the determined rate at which the temperature of the second layer (8) increases after application onto the first layer,
   wherein:
   the step of determining the layer thickness of the second layer involves performing a plurality of sequential temperature measurements before the second layer (8) reaches a maximum temperature (T1); and
   the maximum temperature (T1) represents a point in time at which a rate that heat is conducted from the first layer equals a rate that heat is radiated away from an upper surface of the second layer (8), such that upon reaching the maximum temperature (T1), the temperature of the second layer (8) is no longer increasing.

2. Method according to claim 1, further comprising the step of measuring a temperature in at least one position of said second layer (8) using a temperature sensing device (14).

3. Method according to claim 2, wherein the step of performing the plurality of sequential temperature measurements occurs in the same at least one position of said second layer (8).

4. Method according to claim 2, further comprising the step of fitting a mathematical function to data obtained from said plurality of sequential temperature measurements.

5. Method according to claim 2, wherein the step of measuring a temperature in at least one position of said second layer (8) comprises measuring the temperature in a plurality of positions of said second layer (8), wherein said plurality of positions are distributed over the second layer (8).

6. Method according to claim 2, wherein the temperature sensing device is a thermographic camera (14).

7. Method according to claim 6, wherein the thermographic camera (14) is directed towards an upper surface of the second layer (8).

8. Method according to claim 1, further comprising the step of comparing the determined temperature increase rate with at least one reference value.

\* \* \* \* \*